US008363137B2

(12) United States Patent
Sonoda et al.

(10) Patent No.: US 8,363,137 B2
(45) Date of Patent: Jan. 29, 2013

(54) IMAGE SENSING APPARATUS AND IMAGING SYSTEM

(75) Inventors: Kazuhiro Sonoda, Yokohama (JP); Shintaro Takenaka, Yokohama (JP); Tomoyuki Noda, Kawasaki (JP); Tetsuya Itano, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 12/372,276

(22) Filed: Feb. 17, 2009

(65) Prior Publication Data

US 2009/0219424 A1 Sep. 3, 2009

(30) Foreign Application Priority Data

Feb. 28, 2008 (JP) ................................ 2008-048829
Feb. 4, 2009 (JP) ................................ 2009-024292

(51) Int. Cl.
*H04N 5/335* (2011.01)
(52) U.S. Cl. ......... 348/302; 348/312; 348/316; 348/319
(58) Field of Classification Search .......... 348/296–308, 348/312, 316, 319
See application file for complete search history.

(56) References Cited

U.S. PATENT DOCUMENTS

| 7,030,920 | B1 | 4/2006 | Hayashi et al. ............... 348/302 |
| 7,126,102 | B2 | 10/2006 | Inoue et al. ............... 250/214 R |
| 7,321,110 | B2 | 1/2008 | Okita et al. ................ 250/208.1 |
| 7,382,011 | B2 | 6/2008 | Noda et al. .................... 257/292 |
| 7,408,210 | B2 | 8/2008 | Ogura et al. ................... 257/233 |
| 7,460,162 | B2 | 12/2008 | Koizumi et al. ............. 348/294 |
| 7,462,810 | B2 | 12/2008 | Kobayashi et al. ........ 250/208.1 |
| 7,518,096 | B2 | 4/2009 | Noda .......................... 250/214.1 |
| 7,550,793 | B2 | 6/2009 | Itano et al. ..................... 257/239 |
| 7,561,199 | B2 | 7/2009 | Noda et al. ..................... 348/308 |
| 2005/0057673 | A1* | 3/2005 | Shimomura et al. .......... 348/294 |
| 2007/0024730 | A1* | 2/2007 | Muramatsu et al. .......... 348/308 |
| 2007/0052831 | A1 | 3/2007 | Ogura et al. ................... 348/308 |
| 2007/0126886 | A1 | 6/2007 | Sakurai et al. ................. 348/222 |
| 2007/0165121 | A1 | 7/2007 | Yamauchi ..................... 348/255 |
| 2008/0012976 | A1 | 1/2008 | Sakurai et al. ................. 348/301 |
| 2008/0024634 | A1 | 1/2008 | Takenaka ....................... 348/307 |
| 2008/0029793 | A1 | 2/2008 | Watanabe et al. ............ 257/291 |
| 2008/0030612 | A1 | 2/2008 | Itano et al. ..................... 348/340 |
| 2008/0036891 | A1 | 2/2008 | Ono et al. ...................... 348/308 |

(Continued)

FOREIGN PATENT DOCUMENTS

| JP | 60-249479 A | 12/1985 |
| JP | 64-086677 A | 3/1989 |

(Continued)

*Primary Examiner* — Thomas K Pham
*Assistant Examiner* — Vipin Patel
(74) *Attorney, Agent, or Firm* — Fitzpatrick, Cella, Harper & Scinto

(57) ABSTRACT

An image sensing apparatus comprising on a single semiconductor substrate: a pixel array; a vertical scanning unit; a horizontal scanning unit; a counter which starts a counting operation to count the number of the clocks before a start of the first period, and stops the counting operation before a start of the second period during the first period; and a generation unit which generates a first control signal for causing the vertical scanning unit to drive a pixel, the generation unit including a signal generation unit which generates a second control signal in accordance with the counted value output from the counter, and a delay unit which delays the second control signal to generate the first control signal and output the first control signal to the vertical scanning unit.

10 Claims, 13 Drawing Sheets

U.S. PATENT DOCUMENTS

| | | | |
|---|---|---|---|
| 2008/0129848 A1 | 6/2008 | Yamauchi | 348/246 |
| 2008/0158403 A1 | 7/2008 | Itano et al. | 348/308 |
| 2008/0211950 A1 | 9/2008 | Ono et al. | 348/308 |
| 2008/0225145 A1 | 9/2008 | Sonoda | 348/294 |
| 2008/0291290 A1 | 11/2008 | Sonoda et al. | 348/222.1 |
| 2009/0015699 A1 | 1/2009 | Watanabe et al. | 348/308 |
| 2009/0122172 A1 | 5/2009 | Iwata et al. | 348/302 |
| 2009/0166516 A1 | 7/2009 | Tamura et al. | 250/214.1 |
| 2009/0167914 A1 | 7/2009 | Itano et al. | 348/301 |

FOREIGN PATENT DOCUMENTS

| | | |
|---|---|---|
| JP | 1-168171 A | 7/1989 |
| JP | 7-015671 A | 1/1995 |
| JP | 2001-045383 A | 2/2001 |
| JP | 2003-032548 A | 1/2003 |
| JP | 2007-158626 A | 6/2007 |
| JP | 2007-189537 A | 7/2007 |
| JP | 2007-266760 A | 10/2007 |
| JP | 2008-141595 A | 6/2008 |

* cited by examiner

IMAGE SENSING APPARATUS AND IMAGING SYSTEM

BACKGROUND OF THE INVENTION

1. Field of the Invention

The present invention relates to an image sensing apparatus and imaging system.

2. Description of the Related Art

There has conventionally been proposed an image sensing apparatus having a pixel array (see Japanese Patent Laid-Open No. 2001-045383). According to the technique disclosed in Japanese Patent Laid-Open No. 2001-045383, a shift register for scanning the respective rows or columns of the pixel array is formed from a plurality of circuit blocks. A decoder circuit for selecting one of the circuit blocks is arranged on the preceding stage of the shift register. By selecting a circuit block by the decoder circuit, scanning of pixels can start for each pixel block including a plurality of pixels in the pixel array.

Recently, image sensing apparatuses such as a video camera and still camera require a high-precision electronic anti-shock (camera shake correction) function. As a technique for implementing the electronic anti-shock function, the present inventor has examined to shift a readout region, which is a partial region of the pixel array, in the direction of camera shake in the pixel array. To shift the readout region in the pixel array in order to implement the electronic anti-shock function, the readout start position of the readout region is changed for each pixel (for each row and each column) in the pixel array.

To change the readout start position of the readout region for each pixel, it is necessary to generate a control signal in a horizontal scanning period for scanning a column of the pixel array. For this purpose, a control signal which changes at a predetermined timing needs to be generated by operating a counter for counting clocks in the horizontal scanning period.

In this case, if the counter, pixel array, and peripheral circuit are formed on a single chip, that is, on a single semiconductor substrate, noise generated upon a change of the counted value of the counter may be mixed in a pixel signal output from the pixel array to a subsequent stage via the peripheral circuit. In particular, the level of noise generated upon a change of the counted value of the counter is different between a pixel signal output at the timing when the counted value is carried, and a pixel signal output at another timing. As a result, a vertical streak of fixed-pattern noise is mixed in an obtained image.

SUMMARY OF THE INVENTION

It is an aim of the present invention to suppress mixing, in a pixel signal, of noise generated upon a change of the counted value of a counter in the horizontal scanning period.

According to the first aspect of the present invention, there is provided an image sensing apparatus comprising on a single semiconductor substrate: a pixel array in which a plurality of pixels are arrayed two-dimensionally; a vertical scanning unit which selects a row in the pixel array in synchronism with a clock in a first period; a horizontal scanning unit which scans a column in the pixel array in synchronism with the clock in a second period that starts during the first period; a counter which starts a counting operation to count the number of the clocks before a start of the first period, and stops the counting operation before a start of the second period during the first period; and a generation unit which generates a first control signal for causing the vertical scanning unit to drive a pixel, the generation unit including a signal generation unit which generates a second control signal in accordance with the counted value output from the counter, and a delay unit which delays the second control signal to generate the first control signal and output the first control signal to the vertical scanning unit.

According to the second aspect of the present invention, there is provided an image sensing apparatus comprising on a single semiconductor substrate: a pixel array in which a plurality of pixels are arrayed two-dimensionally; a vertical scanning unit which selects a row in the pixel array in synchronism with a clock in a first period; a horizontal scanning unit which scans a column in the pixel array in synchronism with the clock in a second period subsequent to the first period; a counter which starts a counting operation to count the number of clocks before a start of the first period, and stops the counting operation in the first period; and a generation unit which generates a first control signal for causing the horizontal scanning unit to start scanning, the generation unit including a signal generation unit which generates a second control signal in accordance with the counted value output from the counter, and a delay unit which delays the second control signal to generate the first control signal and output the first control signal to the horizontal scanning unit.

According to the third aspect of the present invention, there is provided an imaging system comprising: an image sensing apparatus according to the first or second aspect of the present invention; an optical system which forms an image on an image sensing surface of the image sensing apparatus; and a signal processing unit which processes a signal output from the image sensing apparatus to generate image data.

The present invention can suppress mixing, in a pixel signal, of noise generated upon a change of the counted value of a counter in the horizontal scanning period.

Further features of the present invention will become apparent from the following description of exemplary embodiments with reference to the attached drawings.

DESCRIPTION OF THE EMBODIMENTS

Figure 1:
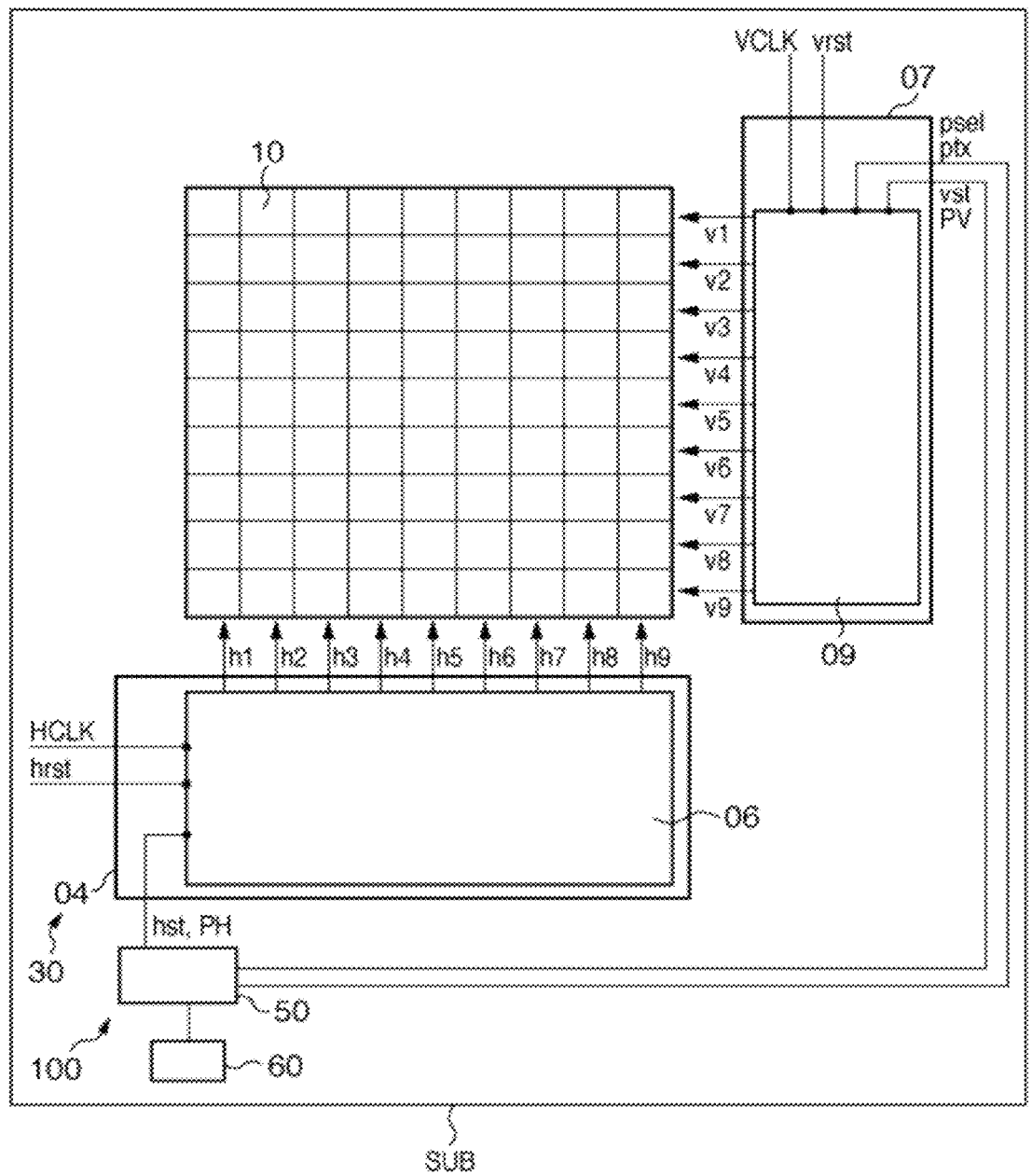
FIG. 1 is a view of the arrangement of an image sensing apparatus 100 according to the first embodiment of the present invention.

The schematic arrangement and schematic operation of an image sensing apparatus 100 according to the first embodiment of the present invention will be described with reference to FIG. 1. FIG. 1 is a view of the arrangement of the image sensing apparatus 100 according to the first embodiment of the present invention.

The image sensing apparatus 100 includes a pixel array 10, scanning unit 30, generation unit 50, and counter circuit 60, which are formed on a single semiconductor substrate SUB.

The pixel array 10 includes a plurality of pixels which receive light corresponding to the optical image of an object and output pixel signals obtained by photoelectrically converting the light. In the pixel array 10, the plurality of pixels are arrayed two-dimensionally (i.e. in the row and column directions). The pixel array 10 is, for example, a region of 9 rows ×9 columns from the lower right end of the pixel array 10.

The scanning unit 30 scans the pixel array 10 to drive respective pixels. The scanning unit 30 includes a vertical scanning unit 07 and horizontal scanning unit 04.

The vertical scanning unit 07 vertically scans the respective rows of the pixel array 10. The vertical scanning unit 07 selects a row in the pixel array 10 in synchronism with a clock VCLK in a first period ST1 (see FIG. 6).

The vertical shift register unit 07 includes a vertical scanning circuit 09. The vertical scanning circuit 09 sequentially scans the respective rows of the pixel array 10 in accordance with vertical scanning signals v1 to v9.

The vertical scanning circuit 09 receives the clock signal VCLK and a reset signal vrst. The vertical scanning circuit 09 also receives a start signal vst.

The horizontal scanning unit 04 horizontally scans the respective columns of the pixel array 10. The horizontal scanning unit 04 selects a column in the pixel array 10 in synchronism with a clock HCLK in a second period ST2 (see FIG. 6) which starts during the first period ST1.

The horizontal scanning unit 04 includes a horizontal scanning circuit 06. The horizontal scanning circuit 06 sequentially scans the respective columns of the pixel array 10 in accordance with horizontal scanning signals h1 to h9.

The horizontal scanning circuit 06 receives the clock signal HCLK and a reset signal hrst. The horizontal scanning circuit 06 also receives a start signal hst.

The generation unit 50 generates the first control signal for causing the vertical scanning circuit 09 to drive pixels. The generation unit 50 supplies the generated first control signal to the vertical scanning circuit 09.

Before the start of the first period ST1, the counter circuit 60 starts a counting operation to count the number of clocks HCLK. Before the start of the second period ST2 during the first period ST1, the counter circuit 60 stops the counting operation.

Figure 2:
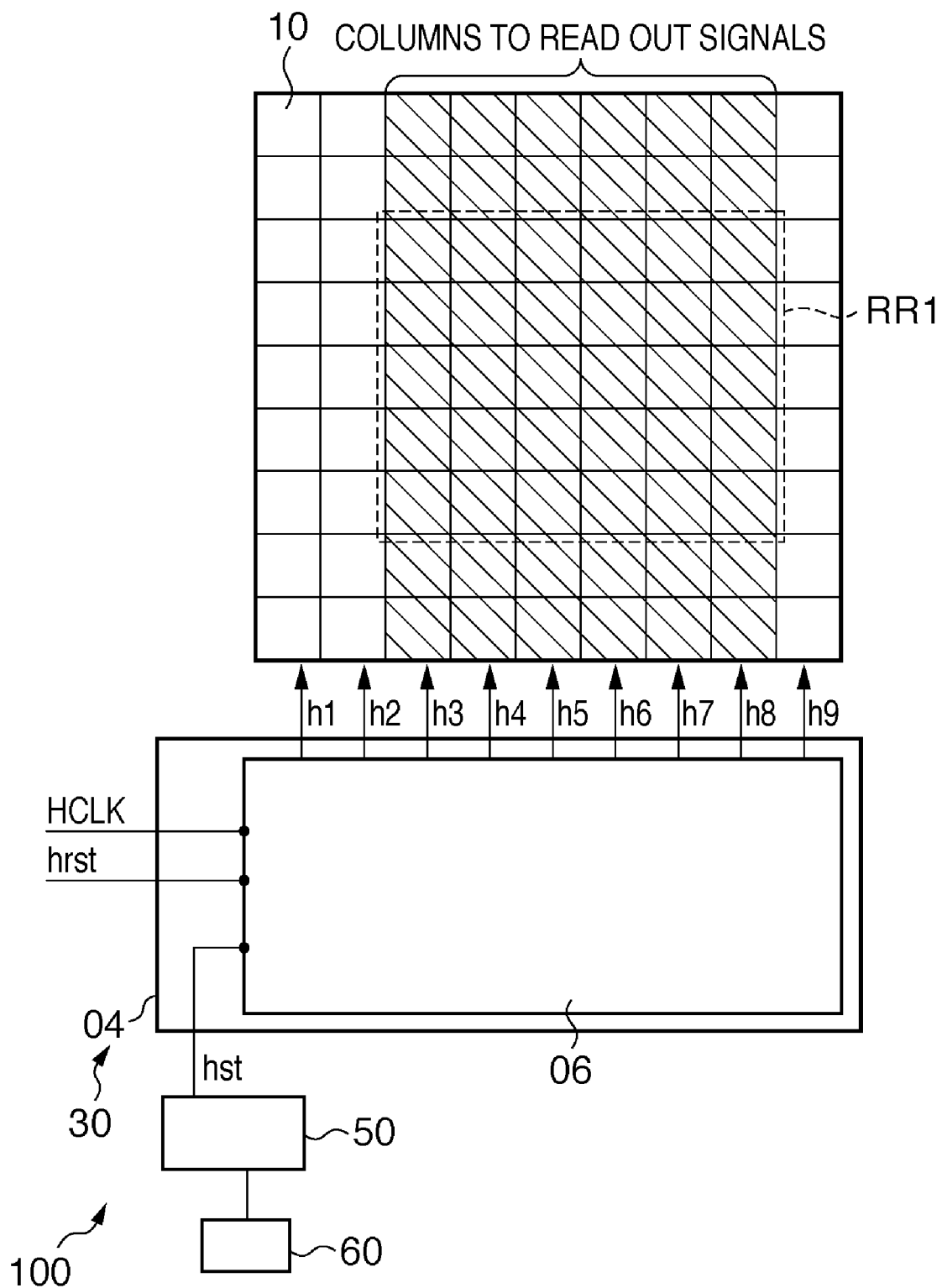
FIG. 2 is a view for explaining a readout region RR1 in a pixel array 10.
Figure 3:
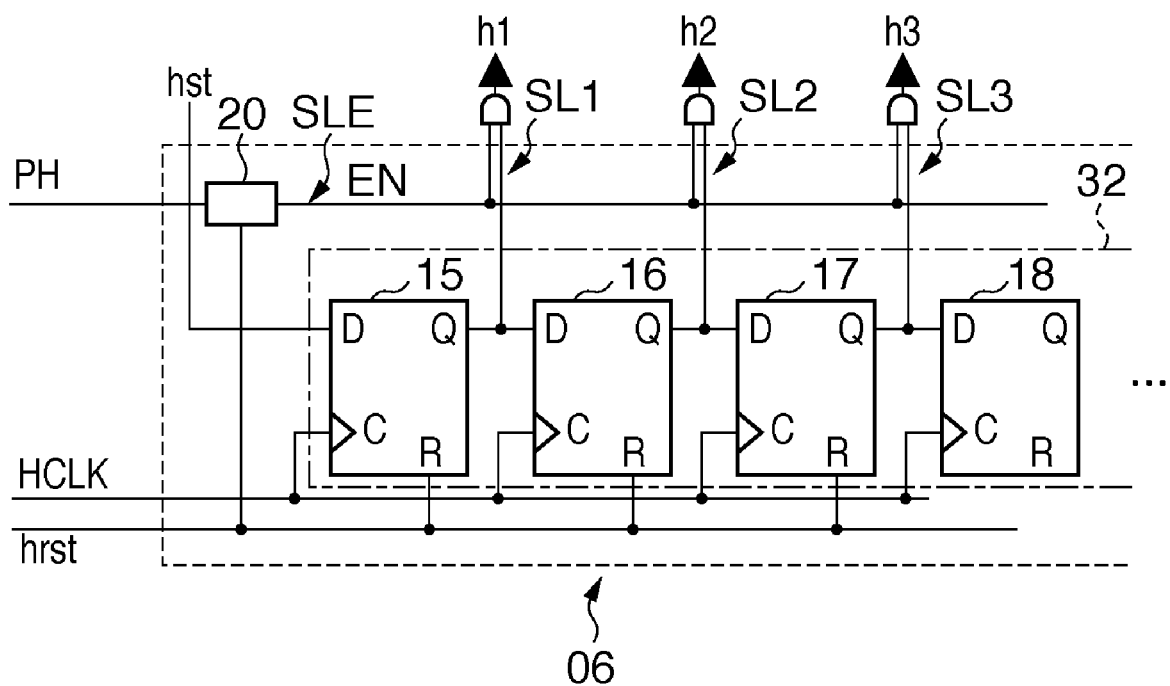
FIG. 3 is a circuit diagram showing the arrangement of part of a horizontal shift register unit.

The arrangement and operation of the horizontal scanning unit 04 will be explained with reference to FIGS. 2 and 3. FIG. 2 is a view for explaining a readout region RR1 in the pixel array 10. FIG. 3 is a circuit diagram showing the arrangement of part of the horizontal scanning unit. The arrangement of part of the horizontal scanning unit 04 shown in FIG. 3 will be mainly described. The arrangement and operation of the vertical scanning unit 07 are the similar as those of the horizontal scanning unit 04.

As described above, the horizontal scanning unit 04 includes the horizontal scanning circuit 06.

The horizontal scanning circuit 06 includes a shift register 32, signal lines SL1, SL2, and SL3, and an enable circuit 20.

The shift register 32 includes flip-flops (e.g., D flip-flops) 15, 16, 17, and 18. The shift register 32 receives the start signal hst, clock signal HCLK, and reset signal hrst via the input terminal D, clock terminal C, and reset terminal R of each flip-flop, respectively.

The signal lines SL1 to SL3 connect the shift register 32 to the pixel array 10. More specifically, the respective pixel columns of the pixel array 10 are connected to the output terminals Q of the flip-flops 15 to 17. The shift register 32 includes as many flip-flops as the columns of the pixel array 10 though those except the flip-flops 15 to 18 are not illustrated in FIG. 3.

Upon receiving the start signal hst, the shift register 32 shifts the start signal hst in synchronism with the clock signal HCLK, thereby sequentially scanning the respective columns of the pixel array 10. Upon receiving the reset signal hrst, the shift register 32 is reset.

Upon receiving a pulse PH, the enable circuit 20 enables a signal output from the shift register 32. An output line SLE of the enable circuit 20 and the signal lines SL1 to SL3 are connected to the respective columns of the pixel array 10 via AND gates.

More specifically, the enable circuit 20 outputs an enable signal EN having non-active level (e.g., an L-level signal) to the output line SLE until the enable circuit 20 receives the pulse PH after it is reset by the reset signal hrst.

Upon receiving the pulse PH, the enable circuit 20 outputs an enable signal EN having active level (e.g., an H-level signal) to the output line SLE. Upon receiving the pulse PH, the enable circuit 20 enables the signal lines SL1 to SL3. The pulse PH is a signal for enabling the signal lines SL1 to SL3. The pulse PH also serves as a signal which is changed to have non-active level to disable the signal lines SL1, ..., thereby masking a pixel signal so as not to horizontally transfer it.

The shift register 32 starts shifting the start signal hst (starts the shift operation) in a horizontal transfer period HT1 to scan the readout region RR1 which is a partial region of the pixel array 10.

It should be noted that the shift register 32 may also include a plurality of clocked inverters instead of a plurality of flip-flops.

Figure 4:
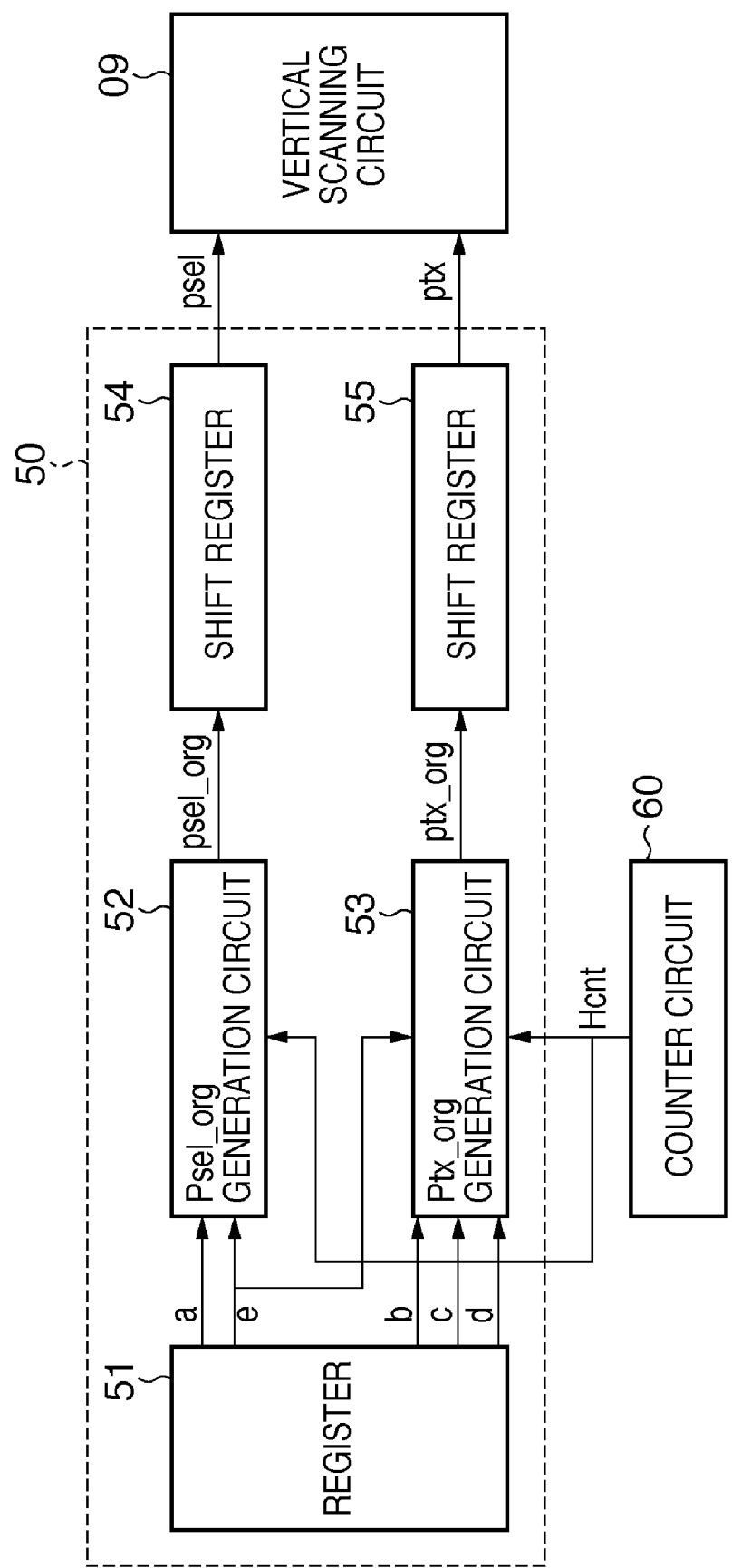
FIG. 4 is a block diagram of the arrangements of a generation unit 50 and counter circuit 60.

The arrangements and operations of the generation unit 50 and counter circuit 60 will be explained with reference to FIG. 4. FIG. 4 is a block diagram of the arrangements of the generation unit 50 and counter circuit 60. The generation unit 50 has a unit (e.g., a PH_org generation circuit to be described later) which generates a signal to be supplied to the horizontal scanning unit. In FIG. 4, a unit which generates a signal to be supplied to the vertical scanning circuit will be explained.

Before the start of the first period ST1, the counter circuit 60 starts a counting operation to count the number of clocks HCLK. Before the start of the second period ST2 (see FIG. 6) during the first period ST1, the counter circuit 60 stops the counting operation. The counter circuit 60 outputs a counted value Hcnt to the generation unit 50.

The generation unit 50 generates first control signals psel and ptx for causing the vertical scanning circuit 09 to drive pixels. Further, the generation unit 50 generates the start signal vst and a pulse PV (neither is shown in FIG. 4). The generation unit 50 outputs the generated signals to the vertical scanning circuit 09 (see FIG. 1). The generation unit 50 includes a register (storage unit) 51, Psel_org generation circuit (signal generation unit) 52, Ptx_org generation circuit (signal generation unit) 53, shift register (delay unit) 54, and shift register (delay unit) 55.

The register 51 stores values a, e, b, c, and d to be counted in the first period ST1. Based on these values, second control signals psel_org and ptx_org (to be described later) for generating the above-mentioned first control signals are generated. Both the first and second control signals will be referred to as control signals.

The Psel_org generation circuit 52 receives the counted value Hcnt from the counter circuit 60. The Psel_org generation circuit 52 generates the control signal psel_org in accordance with the counted value Hcnt output from the counter circuit 60. More specifically, the Psel_org generation circuit 52 compares the counted value Hcnt output from the counter circuit 60 with the values a and e which are stored in the register 51 and are to be counted. When the counted value Hcnt reaches the value a or e, the Psel_org generation circuit 52 generates the control signal psel_org.

The shift register 54 receives the control signal psel_org from the Psel_org generation circuit 52. The shift register 54 shifts the control signal psel_org in synchronism with the clock HCLK to delay the control signal psel_org. The shift register 54 delays the control signal psel_org to generate a control signal psel and output it to the vertical scanning circuit 09 (see FIG. 1).

The Ptx_org generation circuit 53 receives the counted value Hcnt from the counter circuit 60. The Ptx_org generation circuit 53 generates the control signal ptx_org in accordance with the counted value Hcnt output from the counter circuit 60. More specifically, the Ptx_org generation circuit 53 compares the counted value Hcnt output from the counter circuit 60 with the values b, c, and d which are stored in the register 51 and are to be counted. When the counted value Hcnt reaches the value b, c, or d, the Ptx_org generation circuit 53 generates the control signal ptx_org.

The shift register 55 receives the control signal ptx_org from the Ptx_org generation circuit 53. The shift register 55 shifts the control signal ptx_org in synchronism with the clock HCLK to delay the control signal ptx_org. The shift register 55 delays the control signal ptx_org to generate a control signal ptx and output it to the vertical scanning circuit 09 (see FIG. 1).

Figure 5:
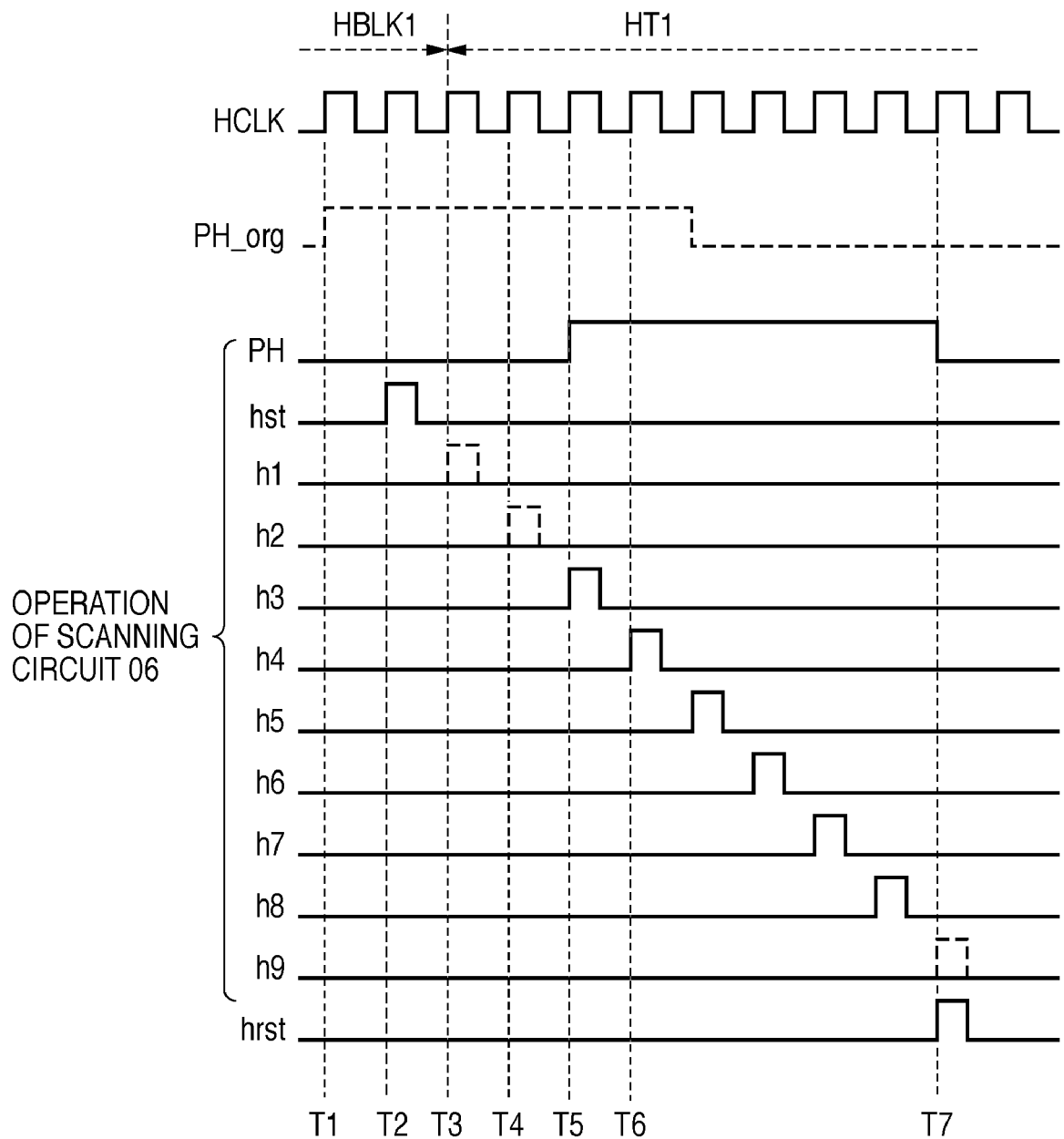
FIG. 5 is a timing chart showing the detailed operation of a scanning unit 30.

Driving timings of horizontal scanning will be explained with reference to FIG. 5. FIG. 5 is a timing chart showing the detailed operation of the horizontal scanning unit 04.

Referring to FIG. 5, a horizontal blanking period HBLK1 is a period between the end of the horizontal transfer period of a preceding row and the start of the horizontal transfer period HT1 of the current row. During this period, the vertical scanning circuit operates to mainly drive the pixel rows of the pixel array. In the horizontal transfer period HT1, the horizontal transfer operation of pixel signals of the current row is executed.

At timing T1, a PH_org generation circuit (not shown) in the generation unit 50 compares the counted value Hcnt output from the counter circuit 60 with a value which is stored in the register 51 and is to be counted. When the counted value Hcnt reaches the value, the PH_org generation circuit generates a control signal PH_org to output it to a subsequent shift register (not shown).

At timing T2, the horizontal scanning circuit 06 receives the start signal hst from the generation unit 50. Upon receiving the start signal hst, the shift register 32 (see FIG. 3) starts shifting the start signal hst (starts the shift operation). At this time, the enable circuit 20 has not received an H-level pulse PH, and keeps the signal lines SL1 to SL3 disabled. The shift register subsequent to the PH_org generation circuit in the generation unit 50 shifts the control signal PH_org by one clock cycle.

At timing T3, the shift register 32 shifts the start signal hst by one clock cycle. At this time, even when an output from the first stage of the shift register 32 is at active level (as indicated by a broken line), the enable circuit 20 keeps the signal lines SL1 to SL3 disabled, so the horizontal scanning signal h1 corresponding to the first column of the pixel array 10 is not changed to have active level. That is, the shift register 32 performs skip scanning of the first column of the pixel array 10. Further, the shift register subsequent to the PH_org generation circuit in the generation unit 50 shifts the control signal PH_org by one clock cycle. The horizontal transfer period HT1 starts from this timing.

At timing T4, the shift register 32 shifts the start signal hst by one clock cycle. At this time, even when an output from the second stage of the shift register 32 is at active level (as indicated by a broken line), the enable circuit 20 keeps the signal lines SL1 to SL3 disabled, so the horizontal scanning signal h2 corresponding to the second column of the pixel array 10 is not changed to have active level. That is, the shift register 32 performs skip scanning of the second column of the pixel array 10. Further, the shift register subsequent to the PH_org generation circuit in the generation unit 50 shifts the control signal PH_org by one clock cycle.

At timing T5, the shift register 32 shifts the start signal hst by one clock cycle. At this time, as an output from the third stage of the shift register 32 is at active level, and as the enable circuit 20 enables the signal lines SL1 to SL3, the horizontal scanning signal h3 corresponding to the third column of the pixel array 10 is changed to have active level. That is, the shift register 32 starts scanning the readout region RR1 in the pixel array 10. The shift register subsequent to the PH_org generation circuit in the generation unit 50 shifts the control signal PH_org by four clock cycles to generate a delayed pulse PH (H level) and output it to the horizontal scanning circuit 06.

At timing T6, the shift register 32 shifts the start signal hst by one clock cycle. At this time, as an output from the fourth stage of the shift register 32 is at active level, and as the enable circuit 20 enables the signal lines SL1 to SL3, the horizontal scanning signal h4 corresponding to the fourth column of the pixel array 10 is changed to have active level. That is, the shift register 32 is scanning the readout region RR1 in the pixel array 10.

Similarly, the shift register 32 sequentially changes the horizontal scanning signals h5 to h8 to have active level to sequentially scan the respective columns (columns to read out signals) of the readout region RR1.

At timing T7, the shift register 32 and enable circuit 20 are reset upon receiving a reset signal hrst having active level. Upon resetting, the shift register 32 ends the shift operation of the start signal hst. Upon resetting, the enable circuit 20 outputs again an enable signal EN having non-active level (e.g., an L-level signal) to the output line SLE. The enable circuit 20 disables the signal lines SL1 to SL3. That is, the horizontal scanning signal h9 corresponding to the ninth column of the pixel array 10 is changed to have non-active level, and the shift register 32 ends scanning of the readout region RR1.

Figure 6:
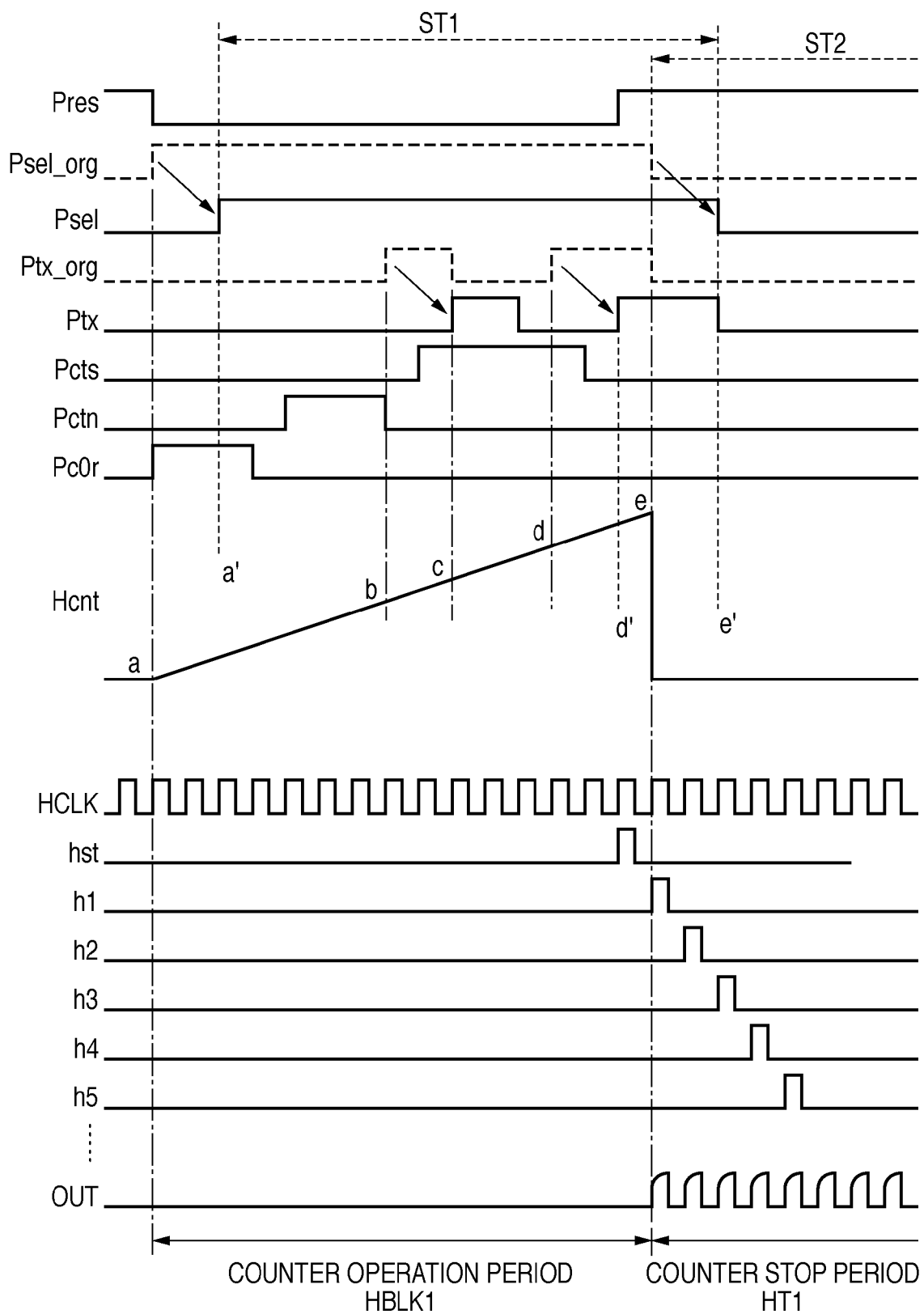
FIG. 6 is a timing chart showing the detailed operations of the generation unit 50 and counter circuit 60.

The detailed operations of the generation unit 50 and counter circuit 60 will be explained with reference to FIG. 6. FIG. 6 is a timing chart showing the detailed operations of the generation unit 50 and counter circuit 60. In FIG. 6, the horizontal blanking period HBLK1 is represented as a "counter operation period", and the horizontal scanning period HT1 is represented as a "counter stop period". A control pulse Pres is supplied to the reset switch of a pixel. A control pulse Psel is supplied to the selection switch of a pixel. A control pulse Ptx is supplied to the transfer switch of a pixel.

Pulses Pcts and Pctn control sampling of a signal to a sampling capacitor arranged for each pixel column. A pulse Pc0r controls supply of a clamp potential to a clamp capacitor arranged for each pixel column. These pulses are supplied as needed.

At timing a, the Psel_org generation circuit 52 compares the counted value Hcnt output from the counter circuit 60 with the value a which is stored in the register 51 and is to be counted. When the counted value Hcnt reaches the value a, the Psel_org generation circuit 52 generates the control signal psel_org and outputs it to the shift register 54.

At timing a', the shift register 54 delays the control signal psel_org (by, for example, two clock cycles) to generate the control signal psel and output it to the vertical scanning circuit 09 (see FIG. 1). The vertical scanning period (first period) ST1 starts from timing a'.

At timing b, the Ptx_org generation circuit 53 compares the counted value Hcnt output from the counter circuit 60 with the value b which is stored in the register 51 and is to be counted. When the counted value Hcnt reaches the value b, the Ptx_org generation circuit 53 generates the control signal ptx_org (H level) and outputs it to the shift register 55.

At timing c, the shift register 55 delays the control signal ptx_org (by, for example, two clock cycles) to generate the control signal ptx and output it to the vertical scanning circuit 09 (see FIG. 1). Also, the Ptx_org generation circuit 53 compares the counted value Hcnt output from the counter circuit 60 with the value c which is stored in the register 51 and is to be counted. When the counted value Hcnt reaches the value c, the Ptx_org generation circuit 53 generates the control signal ptx_org (L level) and outputs it to the shift register 55.

At timing d, the Ptx_org generation circuit 53 compares the counted value Hcnt output from the counter circuit 60 with the value d which is stored in the register 51 and is to be counted. When the counted value Hcnt reaches the value d, the Ptx_org generation circuit 53 generates the control signal ptx_org (H level) and outputs it to the shift register 55.

At timing d', the shift register 55 delays the control signal ptx_org (by, for example, two clock cycles) to generate the control signal ptx and output it to the vertical scanning circuit 09 (see FIG. 1).

At timing e, the Psel_org generation circuit 52 compares the counted value Hcnt output from the counter circuit 60 with the value e which is stored in the register 51 and is to be counted. When the counted value Hcnt reaches the value e, the Psel_org generation circuit 52 generates the control signal psel_org (L level) and outputs it to the shift register 54.

The Psel_org generation circuit 52 and Ptx_org generation circuit 53 compare the counted value Hcnt output from the counter circuit 60 with the value e which is stored in the register 51 and is to be counted. When the counted value Hcnt reaches the value e, the Psel_org generation circuit 52 and Ptx_org generation circuit 53 generate the control signal psel_org (L level) and control signal ptx_org (L level), and output them to the shift registers 54 and 55, respectively.

The horizontal scanning period (second period) ST2 starts from timing e.

At timing e', the shift register 54 delays the control signal psel_org (by, for example, two clock cycles) to generate the control signal psel (L level) and output it to the vertical scanning circuit 09 (see FIG. 1).

The shift register 55 delays the control signal ptx_org (by, for example, two clock cycles) to generate the control signal ptx (L level) and output it to the vertical scanning circuit 09 (see FIG. 1).

At timing e', the vertical scanning period (first period) ST1 ends.

As described above, according to the first embodiment, even when the control signals psel and ptx are supplied to the vertical scanning circuit during the horizontal scanning period in the image sensing apparatus including an on-chip counter circuit which is formed on a single semiconductor substrate, the counter circuit can be stopped during the horizontal scanning period. This can reduce the influence, on a pixel signal, of noise generated upon carrying the counter value, that is, suppress mixing, in a pixel signal, of noise generated upon a change of the counted value of a counter in the horizontal scanning period.

In horizontal extraction and readout for each pixel, degradation of a pixel signal caused by the operation of the counter circuit can be reduced, implementing a high-quality image extraction function.

It should be noted that an OB clamp pulse PBLK for controlling an A/D converter which A/D-converts an image signal in the image sensing apparatus 100 is a pulse for controlling the position where the A/D converter performs OB clamp, and needs to be generated during the horizontal scanning period. Also when the concept of the embodiment is applied to the OB clamp pulse PBLK, the same effects as those of the embodiment can be obtained.

When resetting the photodiode (generating a reset pulse) in the horizontal scanning period in order to implement a slit rolling shutter of 1 HD or less, horizontal transfer is temporarily stopped by generating a signal for masking the horizontal transfer pulse PH. That is, a mask pulse for masking the horizontal transfer pulse needs to be generated during the horizontal scanning period not to transfer a pixel signal influenced by resetting of the photodiode. Also when the concept of the embodiment is applied to the mask pulse, the same effects as those of the embodiment can be obtained.

Figure 7:
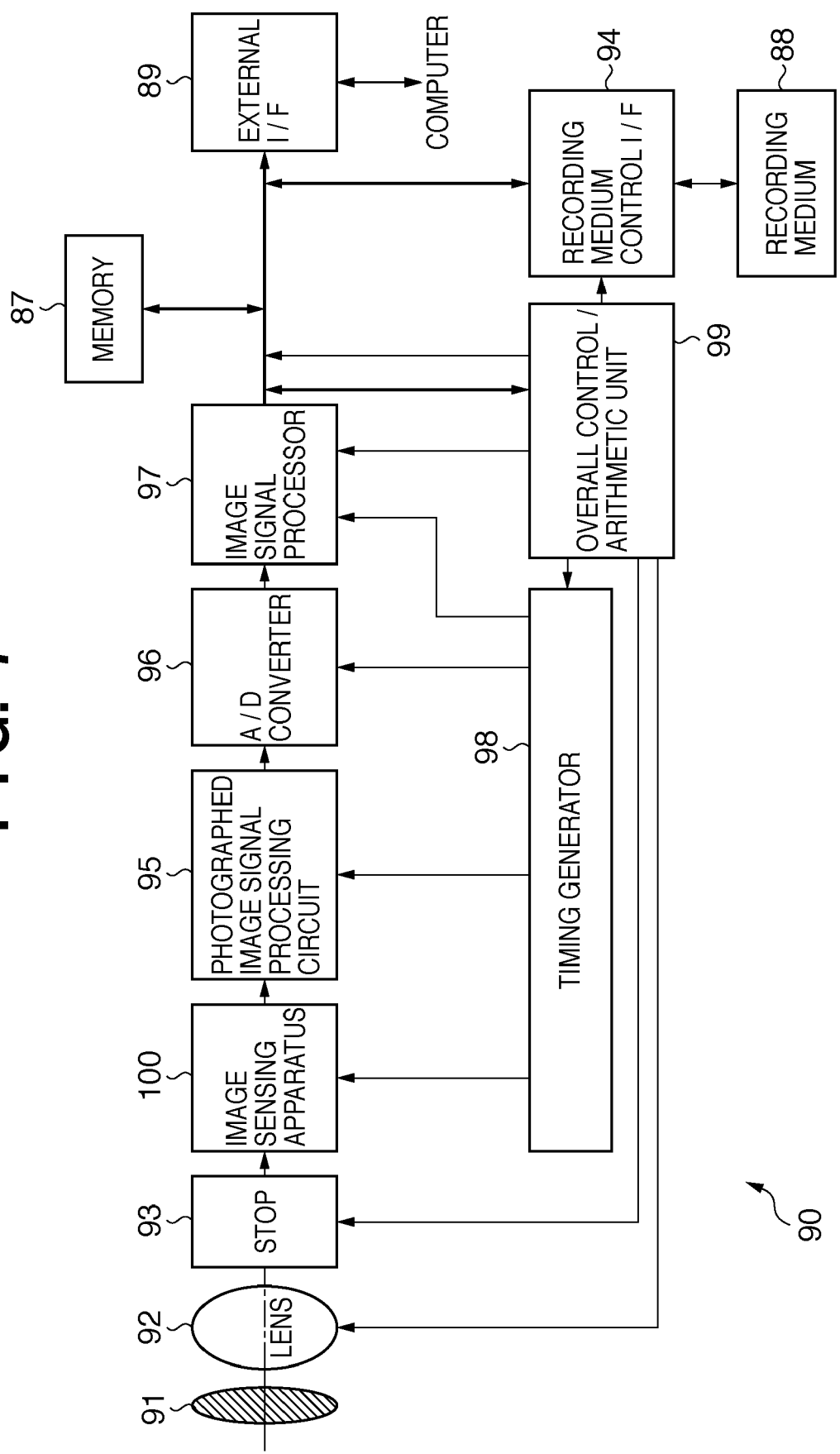
FIG. 7 is a block diagram of an imaging system to which the image sensing apparatus according to the first embodiment is applied.

FIG. 7 shows an example of an imaging system to which the image sensing apparatus according to the present invention is applied.

As shown in FIG. 7, an imaging system 90 mainly includes an optical system, the image sensing apparatus 100, and a signal processing unit. The optical system mainly includes a shutter 91, lens 92, and stop 93. The signal processing unit mainly includes a photographed image signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the pixel array (image sensing surface) of the image sensing apparatus 100.

The stop 93 is interposed between the lens 92 and the image sensing apparatus 100 on the optical path. The stop 93 adjusts the quantity of light guided to the image sensing apparatus 100 after passing through the lens 92.

The image sensing apparatus 100 converts an object image formed on the image sensing surface into an image signal. The image sensing apparatus 100 reads out the image signal from the pixel array, and outputs it.

The photographed image signal processing circuit 95 is connected to the image sensing apparatus 100, and processes an image signal output from the image sensing apparatus 100.

The A/D converter 96 is connected to the photographed image signal processing circuit 95. The A/D converter 96 converts a processed image signal (analog signal) output from the photographed image signal processing circuit 95 into a digital signal.

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., a personal computer) via the external I/F 89.

The timing generator 98 is connected to the image sensing apparatus 100, photographed image signal processing circuit 95, A/D converter 96, and image signal processor 97. The timing generator 98 supplies timing signals to the image sensing apparatus 100, photographed image signal processing circuit 95, A/D converter 96, and image signal processor 97. The image sensing apparatus 100, photographed image signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

With this arrangement, the image sensing apparatus 100 can provide a high-quality image (image data) as long as it can obtain a high-quality image signal.

Figure 8:
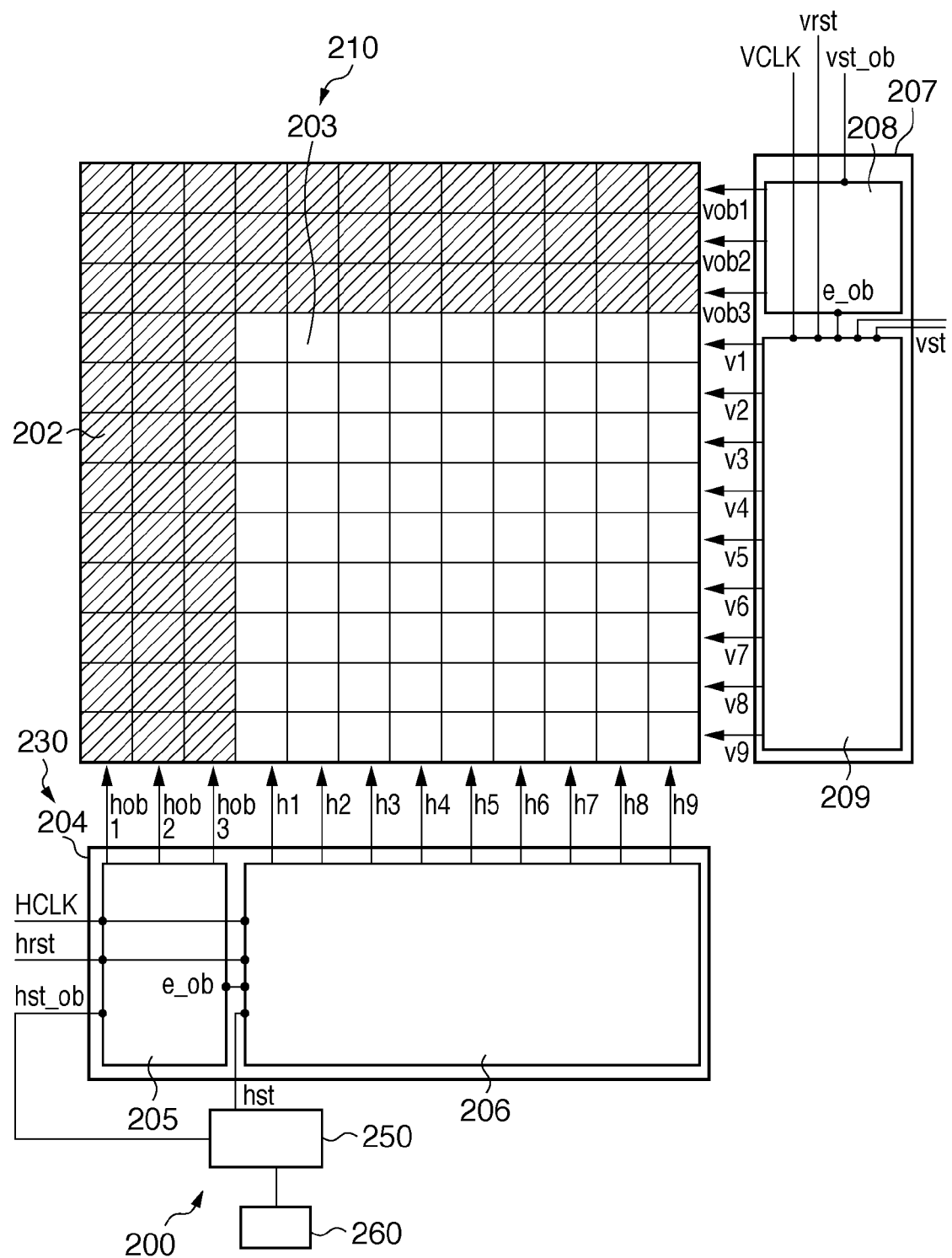
FIG. 8 is a view of the arrangement of an image sensing apparatus 200 according to the second embodiment of the present invention.

An image sensing apparatus 200 according to the second embodiment of the present invention will be explained with reference to FIG. 8. FIG. 8 is a view of the arrangement of the image sensing apparatus 200 according to the second embodiment of the present invention. A difference from the first embodiment will be mainly explained, and a description of the same part will not be repeated.

Instead of the pixel array 10, scanning unit 30, generation unit 50, and counter circuit 60, the image sensing apparatus 200 includes a pixel array 210, scanning unit 230, generation unit 250, and counter circuit 260, which are formed on a single semiconductor substrate.

The pixel array 210 includes an optical black (to be referred to as an OB hereinafter) region 202 and an effective pixel region 203.

The OB region 202 is shielded from light, and includes a plurality of elements for reading out a reference signal for black level. The OB region 202 is, for example, a region of three columns from the left end of the pixel array 210 or three rows from the upper end. The elements can be those which have the same arrangement as that of an effective pixel and are shielded from light. Alternatively, these elements can be those which do not have a region corresponding to a photoelectric conversion unit such as a photodiode in an effective pixel, or has a photodiode of a small-volume region for storing signal charges.

The effective pixel region 203 includes a plurality of pixels which receive light corresponding to the optical image of an object and output pixel signals obtained by photoelectrically converting the light. The effective pixel region 203 is, for example, a region of 9 rows×9 columns from the lower right end of the pixel array 210.

The scanning unit 230 scans the pixel array 210 to drive respective pixels. The scanning unit 230 includes a horizontal scanning unit 204 and vertical scanning unit 207.

The horizontal scanning unit 204 horizontally scans the respective columns of the pixel array 210. The horizontal scanning unit 204 selects a column in the pixel array 210 in synchronism with a clock HCLK in a first period ST201 (see FIG. 13).

The horizontal scanning unit 204 includes first and second horizontal scanning circuits 205 and 206. The first horizontal scanning circuit 205 sequentially scans the respective columns of a region extending in the vertical direction in the OB region 202 in accordance with horizontal scanning signals hob1 to hob3. The second horizontal scanning circuit 206 sequentially scans the respective columns of the effective pixel region 203 in accordance with horizontal scanning signals h1 to h9.

The first and second horizontal scanning circuits 205 and 206 commonly receive the clock signal HCLK and a reset signal hrst. The first and second horizontal scanning circuits 205 and 206 receive a first start signal hst_ob and second start signal hst, respectively. The second horizontal scanning circuit 206 receives an end notification signal e_ob from the first horizontal scanning circuit 205. Since two types of start signals (start pulses) are used for the first and second horizontal scanning circuits 205 and 206, the OB region 202 and effective pixel region 203 can be independently scanned.

The vertical scanning unit 207 vertically scans the respective rows of the pixel array 210. The vertical scanning unit 207 selects a row in the pixel array 210 in synchronism with a clock VCLK in a second period ST202 subsequent to the first period ST201.

The vertical shift register unit 207 includes a first vertical scanning circuit 208 and vertical scanning circuit 209. The first vertical scanning circuit 208 sequentially scans the respective rows of a region extending in the horizontal direction in the OB region 202 in accordance with vertical scanning signals vob1 to vob3. The vertical scanning circuit 209 sequentially scans the respective rows of the effective pixel region 203 in accordance with vertical scanning signals v1 to v9.

The first vertical scanning circuit 208 and vertical scanning circuit 209 commonly receive the clock signal VCLK and a reset signal vrst. The first vertical scanning circuit 208 and vertical scanning circuit 209 receive a start signal (first start signal) vst_ob and start signal (second start signal) vst, respectively. The vertical scanning circuit 209 receives the end notification signal e_ob from the first vertical scanning circuit 208. Since two types of start signals (start pulses) are used for the first vertical scanning circuit 208 and vertical scanning circuit 209, the OB region 202 and effective pixel region 203 can be independently scanned.

The generation unit 250 generates the first control signal for causing the horizontal scanning circuits 205 and 206 to start scanning. The generation unit 250 supplies the generated first control signal to the horizontal scanning circuits 205 and 206.

Before the start of the first period ST201, the counter circuit 260 starts a counting operation to count the number of clocks HCLK. In the first period ST201, the counter circuit 260 stops the counting operation.

Figure 9:
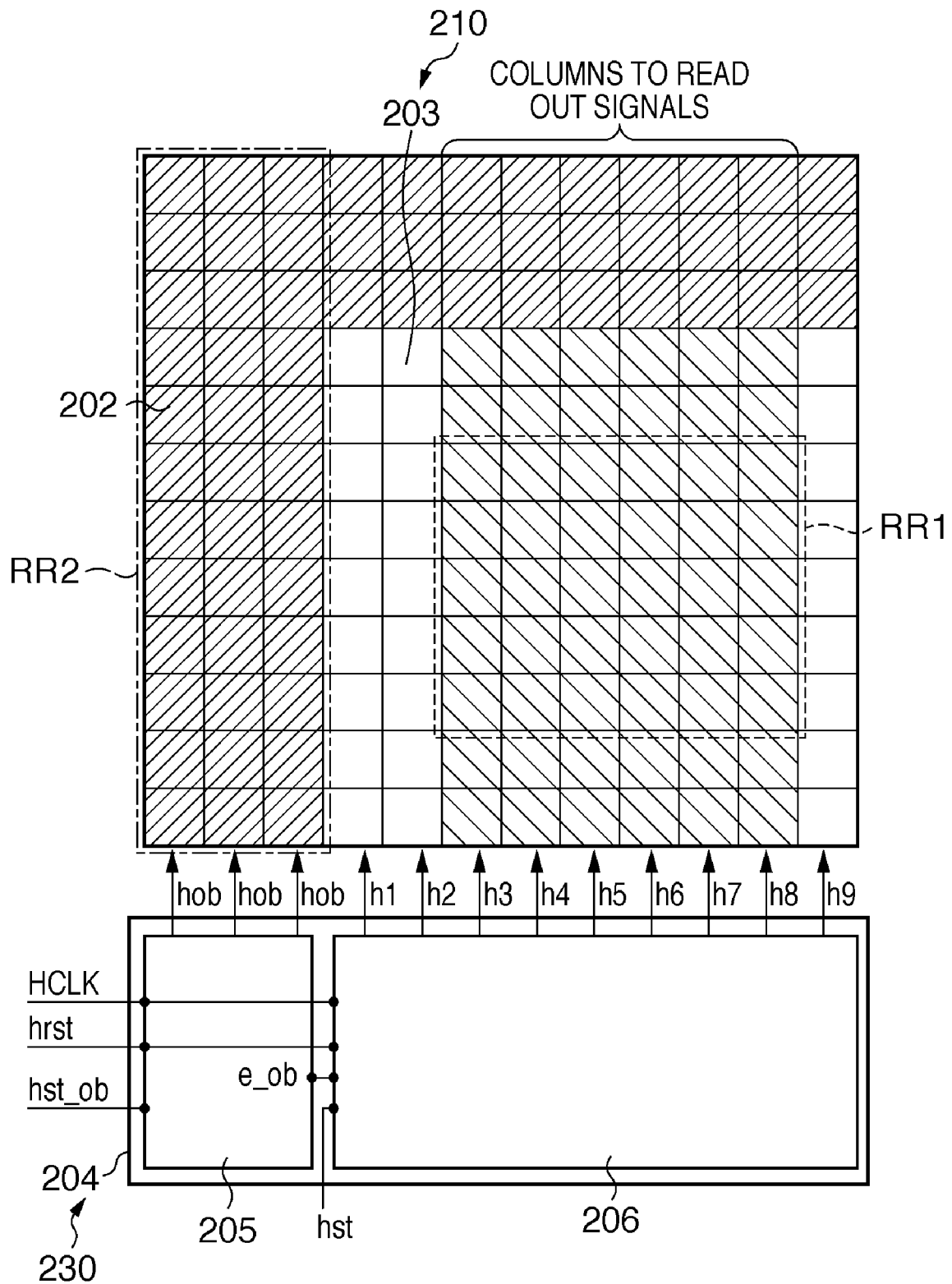
FIG. 9 is a view for explaining a readout region RR1 in an effective pixel region 203.
Figure 10:
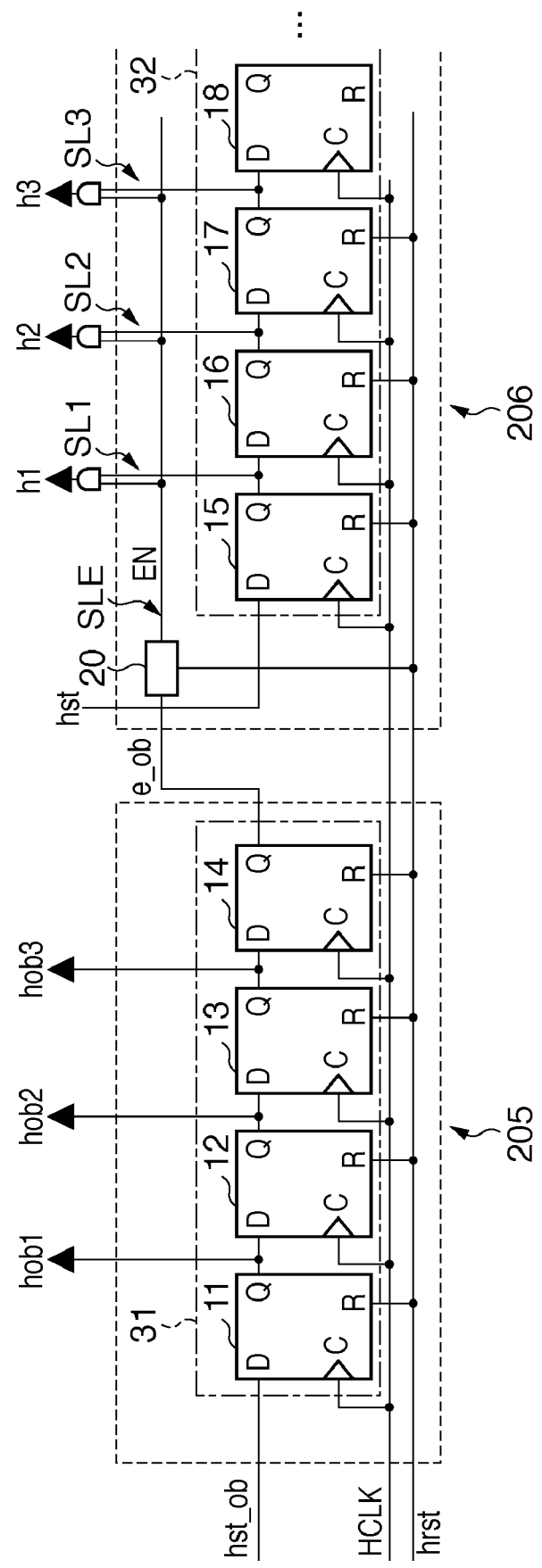
FIG. 10 is a circuit diagram showing the arrangement of part of a horizontal shift register unit.

The arrangement and operation of the horizontal scanning unit 204 will be explained with reference to FIGS. 9 and 10. FIG. 9 is a view for explaining a readout region RR1 in the effective pixel region 203. FIG. 10 is a circuit diagram showing the arrangement of part of the horizontal scanning unit. The arrangement of part of the horizontal scanning unit 204 shown in FIG. 10 will be mainly described. The arrangement and operation of the vertical scanning unit 207 are the same as those of the horizontal scanning unit 204.

As described above, the horizontal scanning unit 204 includes the first and second horizontal scanning circuits 205 and 206.

The first horizontal scanning circuit 205 includes a shift register 31. The shift register 31 includes flip-flops 11 to 14. The shift register 31 receives the first start signal hst_ob, clock signal HCLK, and reset signal hrst via the input terminal D, clock terminal C, and reset terminal R of each flip-flop, respectively. The respective pixel columns of a region RR2 extending in the vertical direction in the OB region 202 are connected to the output terminals Q of the flip-flops 11 to 13. Upon receiving the first start signal hst_ob, the shift register 31 shifts the first start signal hst_ob in synchronism with the clock signal HCLK, thereby sequentially scanning the respective columns of the region RR2 extending in the vertical direction in the OB region 202. The shift register 31 supplies the horizontal scanning signals hob1 to hob3 to the respective columns of the region RR2 in the pixel array 210.

In response to the end of scanning the OB region 202, the shift register 31 outputs the end notification signal e_ob to an enable circuit 20. More specifically, the shift register 31 controls the enable circuit 20 to enable a plurality of signal lines SL1 to SL3 in response to the end of scanning the OB region 202. Upon receiving the reset signal hrst, the shift register 31 is reset.

The second horizontal scanning circuit 206 includes a shift register 32, the signal lines SL1, SL2, and SL3, and the enable circuit 20.

The shift register 32 includes flip-flops (e.g., D flip-flops) 15, 16, 17, and 18. The shift register 32 receives the second start signal hst, clock signal HCLK, and reset signal hrst via the input terminal D, clock terminal C, and reset terminal R of each flip-flop, respectively.

The signal lines SL1 to SL3 connect the shift register 32 to the pixel array 210. More specifically, the respective pixel columns of the effective pixel region 203 are connected to the output terminals Q of the flip-flops 15 to 17. The shift register 32 includes as many flip-flops as the columns of the effective pixel region 203 though those except the flip-flops 15 to 18 are not illustrated in FIG. 10.

Upon receiving the second start signal hst, the shift register 32 shifts the second start signal hst in synchronism with the clock signal HCLK, thereby sequentially scanning the respective columns of the effective pixel region 203. Upon receiving the reset signal hrst, the shift register 32 is reset.

Upon receiving the end notification signal e_ob, the enable circuit 20 enables a signal output from the shift register 32. An output line SLE of the enable circuit 20 and the signal lines SL1 to SL3 are connected via AND gates to the respective columns of the effective pixel region 203 in the pixel array 210.

More specifically, the enable circuit 20 outputs an enable signal EN having non-active level (e.g., an L-level signal) to the output line SLE until the enable circuit 20 receives the end notification signal e_ob after it is reset by the reset signal hrst. The enable circuit 20 disables the signal lines SL1 to SL3 during a period TP1 (see FIG. 12) for scanning the OB region 202 by the shift register 31.

Upon receiving the end notification signal e_ob, the enable circuit 20 outputs an enable signal EN having active level (e.g., an H-level signal) to the output line SLE. Upon receiving the end notification signal e_ob during a period TP2 (see FIG. 12) subsequent to the period TP1, the enable circuit 20 enables the signal lines SL1 to SL3.

In this manner, the shift register 32 starts shifting the second start signal hst (starts the shift operation) in the period TP1, and in the period TP2, scans a readout region RR1 which is a partial region of the effective pixel region 203.

It should be noted that the shift register 32 may also include a plurality of clocked inverters instead of a plurality of flip-flops.

Figure 11:
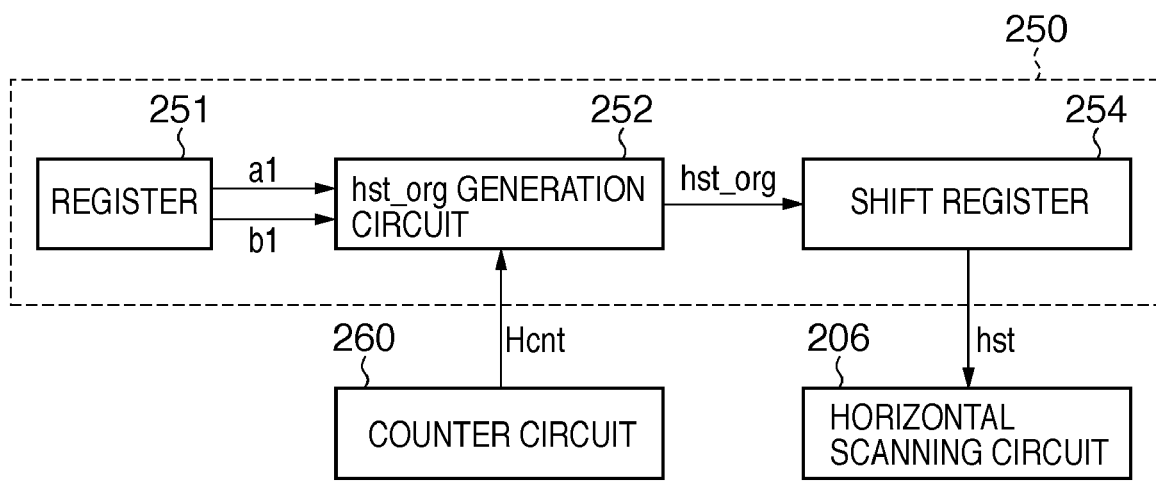
FIG. 11 is a block diagram of the arrangements of a generation unit 250 and counter circuit 260.

The arrangements and operations of the generation unit 250 and counter circuit 260 will be explained with reference to FIG. 11. FIG. 11 is a block diagram of the arrangements of the generation unit 250 and counter circuit 260.

The generation unit 250 has a unit (e.g., a Psel_org generation circuit and Ptx_org generation circuit to be described later) which generate signals to be supplied to the vertical scanning unit. In FIG. 11, a unit which generates a signal to be supplied to the horizontal scanning circuit will be explained.

Before the start of the first period ST201, the counter circuit 260 starts a counting operation to count the number of clocks HCLK. In the first period ST201, the counter circuit 260 stops the counting operation. The counter circuit 260 outputs a counted value Hcnt to the generation unit 250.

The generation unit 250 generates a control signal hst for causing the horizontal scanning circuit 206 to start scanning. The generation unit 250 outputs the generated signal to the horizontal scanning circuit 206. The generation unit 250 includes a register (storage unit) 251, hst_org generation circuit (signal generation unit) 252, and shift register (delay unit) 254.

The register 251 stores values a1 and b1 to be counted in the first period ST201. Based on these values, a second control signal hst_org (to be described later) for generating the above-mentioned first control signal is generated. Both the first and second control signals will be referred to as control signals.

The hst_org generation circuit 252 receives the counted value Hcnt from the counter circuit 260. The hst_org generation circuit 252 generates the control signal hst_org in accordance with the counted value Hcnt output from the counter circuit 260. More specifically, the hst_org generation circuit 252 compares the counted value Hcnt output from the counter circuit 260 with the values a1 and b1 which are stored in the register 251 and are to be counted. When the counted value Hcnt reaches the value a1 or b1, the hst_org generation circuit 252 generates the control signal hst_org.

The shift register 254 receives the control signal hst_org from the hst_org generation circuit 252. The shift register 254 shifts the control signal hst_org in synchronism with the clock HCLK to delay the control signal hst_org. The shift register 254 delays the control signal hst_org to generate a control signal hst and output it to the horizontal scanning circuit 206 (see FIG. 8).

Figure 12:
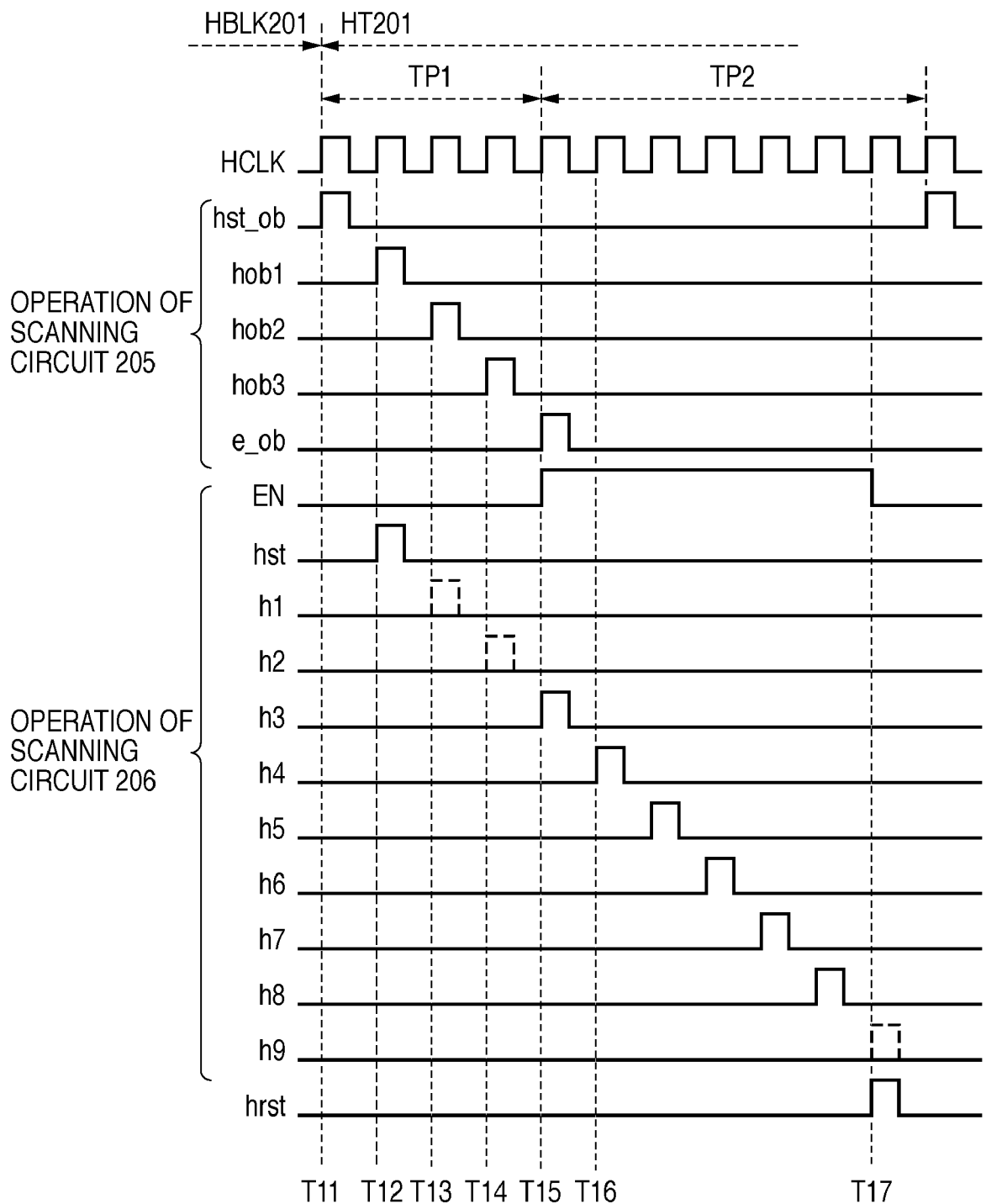
FIG. 12 is a timing chart showing the detailed operation of a scanning unit 230.

Driving timings of horizontal scanning will be explained with reference to FIG. 12. FIG. 12 is a timing chart showing the detailed operation of the horizontal scanning unit 204.

Referring to FIG. 12, the period TP1 is a period during which the shift register 31 scans the OB region 202. The period TP2 follows the period TP1. In the period TP2, the effective pixel region is scanned.

At timing T11, the first start signal hst_ob is input to the first horizontal scanning circuit 205 from the outside (a timing generator 98 as shown in FIG. 7). Upon receiving the first start signal hst_ob, the shift register 31 starts scanning the region RR2 extending in the vertical direction in the OB region 202. The period TP1 starts from this timing.

At timing T12, the shift register 31 shifts the first start signal hst_ob by one clock cycle to change the horizontal scanning signal hob1 corresponding to the first column of the OB region 202 to have active level. Meanwhile, the second start signal hst is input from the outside to the second horizontal scanning circuit 206. Upon receiving the second start signal hst, the shift register 32 starts shifting the second start signal hst (starts the shift operation). At this time, the enable circuit 20 has not received the end notification signal e_ob, and keeps the signal lines SL1 to SL3 disabled.

At timing T13, the shift register 31 shifts the first start signal hst_ob by one clock cycle to change the horizontal scanning signal hob2 corresponding to the second column of the OB region 202 to have active level. The shift register 32 shifts the second start signal hst by one clock cycle. At this time, even when an output from the first stage of the shift register 32 is at active level (as indicated by a broken line), the enable circuit 20 keeps the signal lines SL1 to SL3 disabled, so the horizontal scanning signal h1 corresponding to the first column of the effective pixel region 203 is not changed to have active level. That is, the shift register 32 skips scanning of the first column of the effective pixel region 203.

At timing T14, the shift register 31 shifts the first start signal hst_ob by one clock cycle to change the horizontal scanning signal hob3 corresponding to the third column of the OB region 202 to have active level. The shift register 32 shifts the second start signal hst by one clock cycle. At this time, even when an output from the second stage of the shift register 32 is at active level (as indicated by a broken line), the enable circuit 20 keeps the signal lines SL1 to SL3 disabled, so the horizontal scanning signal h2 corresponding to the second column of the effective pixel region 203 is not changed to have active level. That is, the shift register 32 performs skip scanning of the second column of the effective pixel region 203.

At timing T15 (third step), the shift register 31 shifts the first start signal hst_ob by one clock cycle to output the end notification signal e_ob to the enable circuit 20. More specifically, in response to the end of scanning the OB region 202, the shift register 31 controls the enable circuit 20 to enable the signal lines SL1 to SL3. Upon receiving the end notification signal e_ob, the enable circuit 20 outputs an enable signal EN having active level (e.g., an H-level signal) to the output line SLE. The enable circuit 20 enables the signal lines SL1 to SL3. The shift register 32 shifts the second start signal hst by one clock cycle. At this time, an output from the third stage of the shift register 32 is at active level, the enable circuit 20 enables the signal lines SL1 to SL3, and thus the horizontal scanning signal h3 corresponding to the third column of the effective pixel region 203 is changed to have active level. That is, the shift register 32 starts scanning the readout region RR1 in the effective pixel region 203. The period TP1 ends at this timing, and the period TP2 starts from this timing.

At timing T16, the shift register 32 shifts the second start signal hst by one clock cycle. At this time, an output from the fourth stage of the shift register 32 is at active level, the enable circuit 20 enables the signal lines SL1 to SL3, and thus the horizontal scanning signal h4 corresponding to the fourth column of the effective pixel region 203 is changed to have active level. That is, the shift register 32 scans the readout region RR1 in the effective pixel region 203.

Similarly, the shift register 32 sequentially changes the horizontal scanning signals h5 to h8 to have active level to sequentially scan the respective columns (columns to read out signals) of the readout region RR1.

At timing T17, the shift register 31, shift register 32, and enable circuit 20 are reset upon receiving a reset signal hrst having active level. Upon resetting, the shift register 32 ends the shift operation of the second start signal hst. Upon resetting, the enable circuit 20 outputs again an enable signal EN having non-active level (e.g., an L-level signal) to the output line SLE. The enable circuit 20 disables the signal lines SL1 to SL3. That is, the horizontal scanning signal h9 corresponding to the ninth column of the effective pixel region 203 is changed to have non-active level, and the shift register 32 ends scanning of the readout region RR1.

Figure 13:
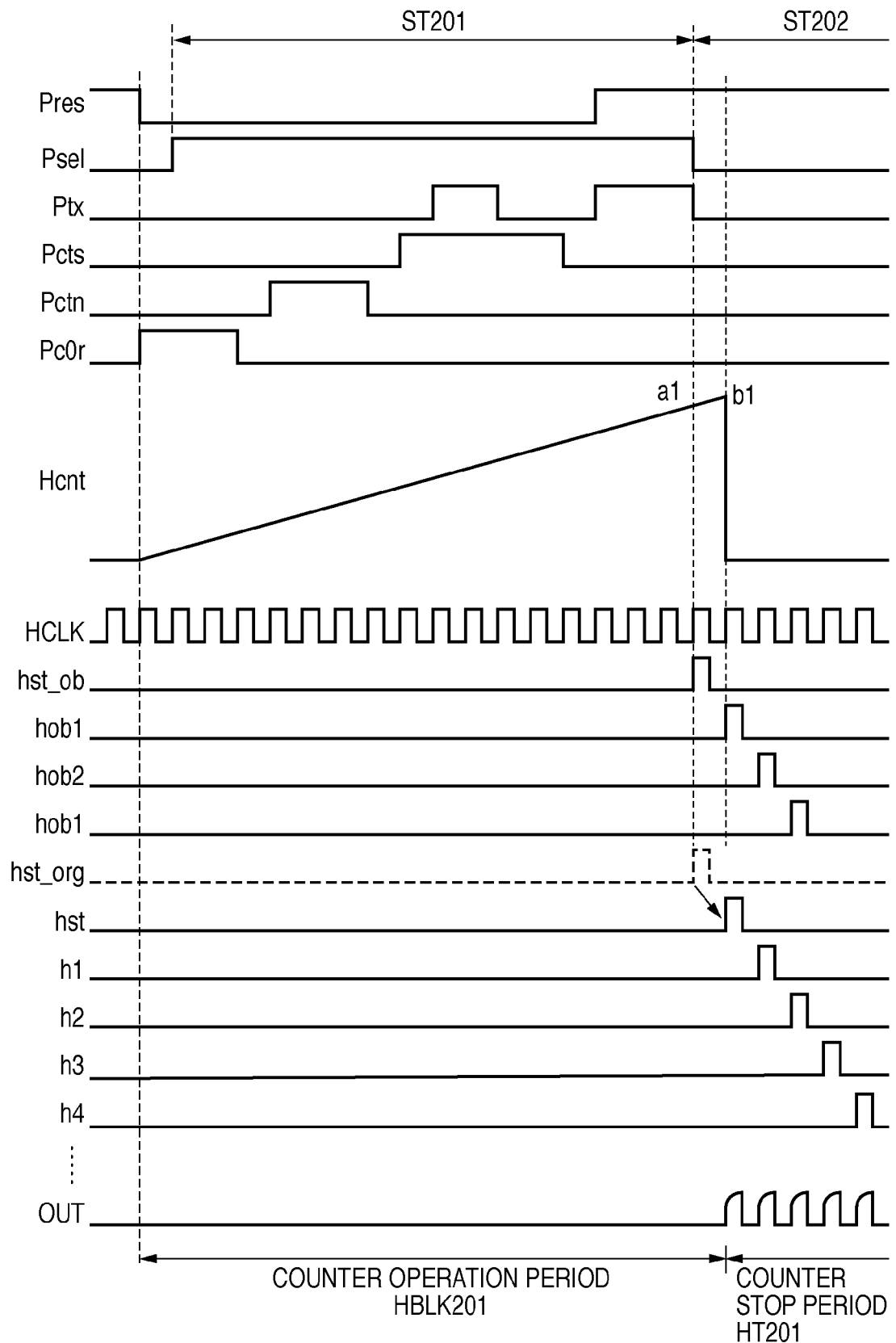
FIG. 13 is a timing chart showing the detailed operations of the generation unit 250 and counter circuit 260.

The detailed operations of the generation unit 250 and counter circuit 260 will be explained with reference to FIG. 13. FIG. 13 is a timing chart showing the detailed operations of the generation unit 250 and counter circuit 260. In FIG. 13, a horizontal blanking period HBLK201 is represented as a "counter operation period", and a horizontal scanning period HT201 is represented as a "counter stop period".

A control pulse Pres is supplied to the reset switch of a pixel. A control pulse Psel is supplied to the selection switch of a pixel. A control pulse Ptx is supplied to the transfer switch of a pixel.

Pulses Pcts and Pctn control sampling of a signal to a sampling capacitor arranged for each pixel column. A pulse Pc0r controls supply of a clamp potential to a clamp capacitor arranged for each pixel column. These pulses are supplied as needed.

At timing a1, the hst_org generation circuit 252 compares the counted value Hcnt output from the counter circuit 260 with the value a1 which is stored in the register 251 and is to be counted. When the counted value Hcnt reaches the value a1, the hst_org generation circuit 252 generates the control signal hst_org and outputs it to the shift register 254. The vertical scanning period (first period) ST201 ends at timing a1, and the horizontal scanning period (second period) ST202 starts from timing a1.

At timing b1, the shift register 254 delays the control signal hst_org (by, for example, one clock cycle) to generate the control signal hst and output it to the horizontal scanning circuit 206 (see FIG. 8).

In this way, according to the second embodiment, when the control signal hst is supplied to the horizontal scanning circuit during the horizontal scanning period in the image sensing apparatus including an on-chip counter circuit, the counter circuit can be stopped during the horizontal scanning period. This can reduce the influence, on a pixel signal, of noise generated upon carrying the counter value, that is, suppress mixing, in a pixel signal, of noise generated upon a change of the counted value of a counter in the horizontal scanning period.

In horizontal extraction and readout for each pixel, degradation of a pixel signal caused by the operation of the counter circuit can be reduced, implementing a high-quality image extraction function.

The shift register 32 receives the second start signal hst in the period TP1 at a timing (e.g., timing T12 in FIG. 12) to start scanning the readout region RR1 from the start of the period TP2. With this setting, the period until scanning of the readout region RR1 for each pixel in the effective pixel region 203 starts after the end of scanning the OB region 202 can be shortened without arranging a decoder circuit for selecting one of flip-flops which form a shift register. As a result, the period until scanning of the readout region for each pixel in the effective pixel region starts after the end of scanning the optical black region can be shortened by a simple arrangement.

Concrete arrangements of the present invention have been described in the embodiments. The pixel array has not been described in detail, but a known arrangement is available. For example, Japanese Patent Laid-Open Nos. 2003-032548, 2007-158626, 2007-189537, 2007-266760, and 2008-141595 disclose detailed arrangements. Respective control signals shown in FIGS. 6, 13, and the like can be supplied to the transfer switch, reset switch, and selection switch of a pixel, a column amplifier arranged for each pixel column, the accumulation capacitor, and the like.

As the arrangement of each scanning circuit, a scanning circuit using a shift register has been exemplified, but the scanning circuit is not limited to this. A decoder may also be used to improve random accessibility. It suffices to generate a control signal to be supplied to each scanning circuit by delaying a signal generated during the horizontal blanking period by using an on-chip counter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-048829 filed Feb. 28, 2008 and 2009-024292 filed Feb. 4, 2009, which are hereby incorporated by reference herein in their entirety.

What is claimed is:

1. An image sensing apparatus comprising on a single semiconductor substrate:
   a pixel array in which a plurality of pixels are arrayed two-dimensionally;
   a vertical scanning unit which scans a row in the pixel array, wherein the vertical scanning unit selects, in a first period, a row in the pixel array in synchronism with a clock;
   a horizontal scanning unit which scans, in a second period that starts during the first period, a column in the pixel array in synchronism with the clock;
   a counter which starts a counting operation to count the number of clock cycles before a start of the first period, and stops the counting operation before a start of the second period during the first period; and
   a generation unit which generates a first control signal for causing the vertical scanning unit to drive a pixel in the pixel array,
   the generation unit including
      a signal generation unit which generates a second control signal in accordance with the counted value output from the counter, and
      a delay unit which delays the second control signal to generate the first control signal and output the first control signal to the vertical scanning unit.

2. The apparatus according to claim 1, wherein the delay unit includes a shift register which shifts the second control signal in synchronism with the clock, thereby delaying the second control signal.

3. The apparatus according to claim 1, wherein
   the generation unit further includes a storage unit which stores a value to be counted in the first period, and
   the signal generation unit compares the counted value output from the counter with the value which is stored in the storage unit and is to be counted, and generates the second control signal when the counted value reaches the value to be counted.

4. An imaging system comprising:
   an image sensing apparatus defined in claim 1;
   an optical system which forms an image on an image sensing surface of the image sensing apparatus; and
   a signal processing unit which processes a signal output from the image sensing apparatus to generate image data.

5. An image sensing apparatus comprising on a single semiconductor substrate:
   a pixel array in which a plurality of pixels are arrayed two-dimensionally;
   a vertical scanning unit which scans a row in the pixel array, wherein the vertical scanning unit selects a row in the pixel array in synchronism with a clock;
   a counter which starts a counting operation to count the number of clock cycles before the vertical scanning unit starts an operation of selecting of a row;
   a horizontal scanning unit which starts, after the counter stops the counting operation, scanning a column in the pixel array in synchronism with the clock; and
   a generation unit which generates a first control signal for causing the horizontal scanning unit to start scanning,
   the generation unit including
      a signal generation unit which generates a second control signal in accordance with the counted value output from the counter, and
      a delay unit which delays the second control signal to generate the first control signal and output the first control signal to the horizontal scanning unit.

6. The apparatus according to claim 5, wherein the delay unit includes a shift register which shifts the second control signal in synchronism with the clock, thereby delaying the second control signal.

7. The apparatus according to claim 5, wherein
   the generation unit further includes a storage unit which stores a value to be counted, and
   the signal generation unit compares the counted value output from the counter with the value which is stored in the storage unit and is to be counted, and generates the second control signal when the counted value reaches the value to be counted.

8. An imaging system comprising:
   an image sensing apparatus defined in claim 5;
   an optical system which forms an image on an image sensing surface of the image sensing apparatus; and
   a signal processing unit which processes a signal output from the image sensing apparatus to generate image data.

9. A method of operating an image sensing apparatus that comprises, on a single semiconductor substrate, a pixel array in which a plurality of pixels are arrayed two-dimensionally, a vertical scanning unit, a horizontal scanning unit, and a counter, the method comprising:
   causing the vertical scanning unit to select, in a first period, a row in the pixel array in synchronism with a clock;
   causing the horizontal scanning unit to scan, in a second period that starts during the first period, a column in the pixel array in synchronism with the clock;
   causing the counter to start a counting operation of counting the number of clock cycles before a start of the first period, and to stop the counting operation before a start of the second period during the first period; and generating a first control signal for causing the vertical scanning unit to drive a pixel in the pixel array, the generating of the first control signal including generating a second control signal in accordance with the counted value output from the counter, and delaying the second control signal to generate the first control signal.

10. A method of operating an image sensing apparatus that comprises, on a single semiconductor substrate, a pixel array in which a plurality of pixels are arrayed two-dimensionally, a vertical scanning unit, a horizontal scanning unit, and a counter, the method comprising:

causing the vertical scanning unit to select a row in the pixel array in synchronism with a clock;

causing the counter to start a counting operation of counting the number of clock cycles before the vertical scanning unit starts an operation of selecting of a row;

causing the horizontal scanning unit to start, after the counter stops the counting operation, scanning of a column in the pixel array in synchronism with the clock; and generating a first control signal for causing the vertical scanning unit to drive a pixel in the pixel array, the generating of the first control signal including generating a second control signal in accordance with the counted value output from the counter, and delaying the second control signal to generate the first control signal.

* * * * *